United States Patent

[11] 3,588,591

[72] Inventors John R. Harris;
Gerald E. Rigsby, Anderson, Ind.
[21] Appl. No. 884,152
[22] Filed Dec. 11, 1969
[45] Patented June 28, 1971
[73] Assignee General Motors Corporation
Detroit, Mich.

[54] AUTOMOBILE HEADLIGHT SYSTEM INCLUDING TIME DELAY CIRCUIT OF CIGAR LIGHTER
2 Claims, 2 Drawing Figs.
[52] U.S. Cl. ............................................. 315/77,
307/10, 315/82
[51] Int. Cl. .............................................. B60q 1/02
[50] Field of Search ................................ 315/82, 77;
307/10

[56] References Cited
UNITED STATES PATENTS
2,806,980   9/1957   Shapiro ..................... 315/77X
3,389,296   6/1968   Carruth ..................... 315/82X Primary Examiner—Roy Lake
Assistant Examiner—Palmer C. Demeo
Attorneys—J. L. Carpenter and Paul Fitzpatrick ABSTRACT: A vehicle headlamp control circuit wherein current is supplied through a cigar lighter and a relay coil to turn on the headlamps with the vehicle ignition switch open and to turn them off automatically. A resistor in series with the cigar lighter permits alteration of the turnoff delay time. Closure of the ignition switch provides a shunt path across the relay coil and resistor for normal cigar lighter operation.

PATENTED JUN28 1971　　　　　　　　　　　　　3,588,591

INVENTORS
John R. Harris &
BY Gerald E. Rigsby
Paul Fitzpatrick
ATTORNEY

AUTOMOBILE HEADLIGHT SYSTEM INCLUDING TIME DELAY CIRCUIT OF CIGAR LIGHTER

This invention is directed to control means for vehicle headlamps operable to turn on the vehicle's headlamps with the ignition of the vehicle off and automatically turn them off after a predetermined delay, and in particular to such control means that use the vehicle cigar lighter to provide the automatic turnoff.

Circuits to hold a vehicle's headlamps on after the ignition is turned off and later automatically turn the headlamps off are not new in the art. These circuits generally contain some form of time delay circuit or device and, if operator actuated, an actuator switch.

My invention, however, needs no added time delay circuitry or separate actuator switch since it uses the cigar lighter, a standard device on most vehicles, for both of these functions. To use my invention the operator turns the ignition off and pushes the cigar lighter on. The headlamps are immediately turned on and remain on for a preset duration, which can be made much longer than the cigar lighter's usual period of operation without undue heating of the cigar lighter. When the cigar lighter automatically turns itself off the headlamps are also turned off. When the ignition is on however, the cigar lighter operates independently of the headlamps in the normal manner.

Figure 1:
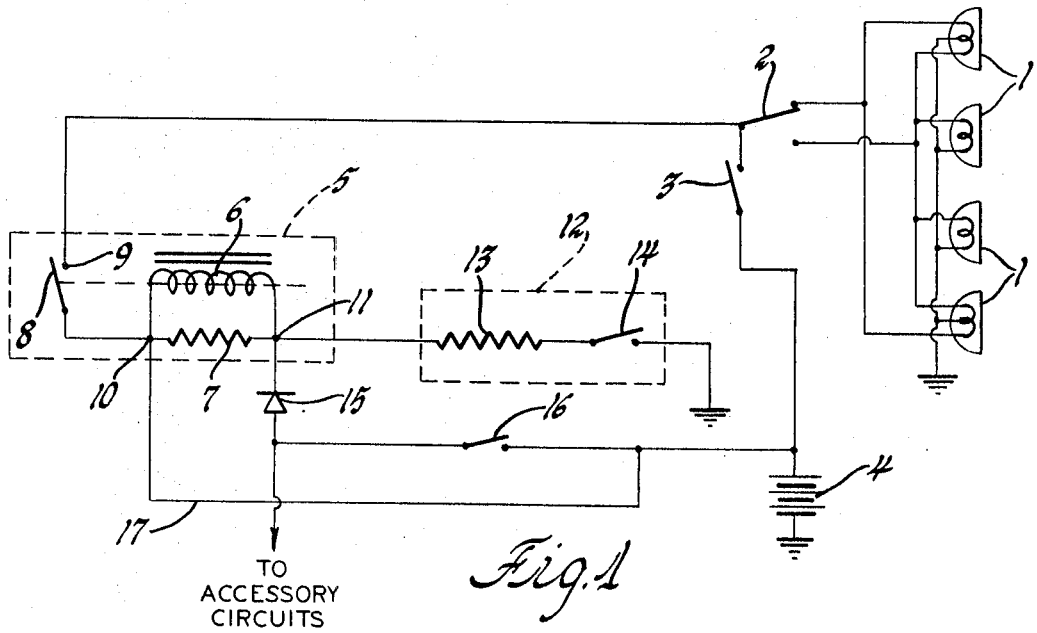
Figure 2:
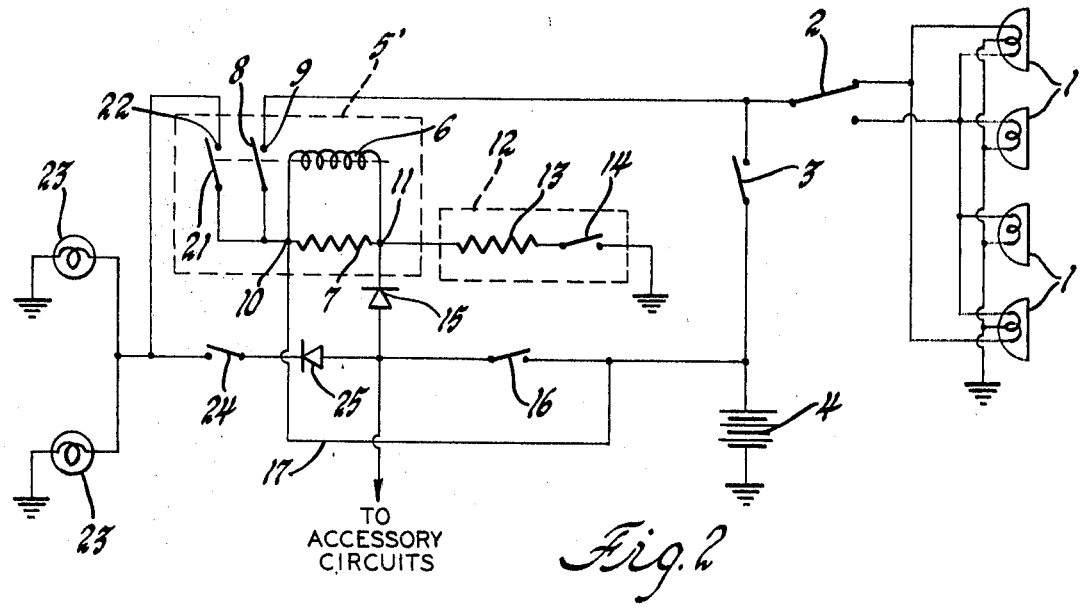

The nature of my invention and its advantages will be more fully apparent from the succeeding detailed description of preferred embodiments and accompany drawings in which:

FIG. 1 is a circuit drawing of a preferred embodiment of the circuit by which vehicle headlamps are controlled and FIG. 2 is the same circuit modified to operate backup lamps in addition to headlamps.

Referring to FIG. 1, standard vehicle headlamps 1 are shown connected in the normal manner through a dimmer switch 2 and headlight switch 3 to the vehicle electric energy source 4, usually a 12-volt battery. A common ground completes the circuit. Also shown is a normally open relay 5 including relay coil 6, resistor 7, armature 8 and contact 9. The armature 8 is connected to one end of the relay coil at junction 10 and the resistor 7 is connected in parallel with the relay coil.

A cigar lighter 12 is shown in its equivalent circuit form of a resistor 13 in series with a switch 14. When the switch 14 is manually closed by pushing the lighter into its receptacle, electric current through the resistor 13 heats the cigar lighter until, at a certain preset temperature, the switch 14 is automatically opened and the cigar lighter is ready for use. The cigar lighter is connected between the common ground and junction 11 of the relay. Junction 11 is connected to the battery through a diode 15 and the accessory portion 16 of the ignition switch. Junction 10 is connected directly to the battery. The relay contact 9 is connected to a point between the headlamp switch 3 and dimmer switch 2.

The operation of the circuit will now be described. Assuming that the vehicle is stopped and the switches 3 and 16 are both open, to light the headlamps for the preset period the driver closes the switch in the cigar lighter, which is done in most cases by depressing the cigar lighter handle into the dashboard. A circuit is now closed from the battery 4 to ground through line 17, junction 10, resistor 7 and relay coil 6 in parallel, junction 11, and the cigar lighter 12. The current through relay coil 6 is sufficient to close armature 8 against contact 9 and keep it closed as current flows from junction 10 through the armature 8, contact 9 and dimmer switch 2 to the headlamps 1. The current through the headlamps causes them to light to provide illumination of the area in front of the vehicle. The headlamps will remain lit as the cigar lighter increases in temperature. At the critical temperature the switch 14 in the cigar lighter opens and current ceases to flow through the relay coil 6. The armature 8 is released and the headlamps are extinguished. Since the parallel resistance of resistor 7 and coil 6 is added to that of resistor 13, the current through resistor 13 will be smaller than that which flows through the cigar lighter in normal use, so it will take longer than normal for the cigar lighter to reach the temperature necessary to open switch 14. Proper selection of a value for resistor 7 provides the desired duration of headlamp illumination; a variable resistor would allow operator control for individual needs.

If the cigar lighter is actuated with switch 16 closed, however, diode 15 provides a shunt path for current from the battery 4 to junction 11 and through the cigar lighter. Since the forward biased diode's resistance is small compared to the resistance of the parallel relay coil 6 and resistor 7 the current through the relay coil will be insufficient to close the armature 8 and the headlamps will not light.

In addition, the resistance determining current through the cigar lighter will be approximately that of resistor 13 so that the cigar lighter will heat at a faster rate for normal operation.

The purpose of diode 15 is to prevent relay coil 6 and resistor 7 from providing a shunt path for current across switch 16 when that switch is open.

In FIG. 2 the circuit is modified to also operate the backup lamps. The relay 5' includes a second armature 21 that is operated simultaneously with the first armature 8 and a second contact 22. Alternatively, a single armature could close both contacts 9 and 22. The contact 22 is connected through the vehicle backup lamps 23 to ground and through the backup lamp switch 24 and a diode 25 to the accessory side of the ignition switch 16. The remainder of the circuit is identical to that in FIG. 1 without backup lamps.

The operation of the circuit of FIG. 2 is identical with that of the circuit of FIG. 1 except that the relay connects a circuit through armature 21 and contact 22 to light the backup lamps along with the headlamps. The backup lamp switch 24 is a standard transmission operated switch that lights the backup lamps whenever the vehicle transmission is in reverse. Diode 25 prevents relay armature 21, contact 22 and backup lamp switch 24 from providing a shunt path for current across switch 16 when that switch is open.

The scope of the invention is not to be considered as limited by the preceding detailed description.

We claim:

1. A vehicle lamp energizing apparatus effective to energize the vehicle lamps and capable of ending such energization automatically after a predetermined period of time; the apparatus comprising, in combination: an electric cigar lighter unit with delayed self-termination, manually operable switch means effective to energize the lamps through a first circuit, a relay having an operating coil effective in one condition of energization to energize the lamps through a second circuit; and switch elements effective in one state to energize the operating coil and cigar lighter through a third circuit and in another state to energize the cigar lighter alone through a fourth circuit.

2. A vehicle mounted lamp energizing circuit comprising, in combination: vehicle mounted lamps; an energy source; a cigar lighter having current operated time delay means and deactivation means controlled thereby for rendering the cigar lighter nonconducting; current controlled switch means having switch control means connectable in series with the cigar lighter to connect the lamps to the energy source when the cigar lighter is conducting and disconnect the lamps from the energy source when the cigar lighter is not conducting; a current limiting element in series with the cigar lighter and effective to prolong the delay time thereof; a further switch means operable to provide an alternate current path between the energy source and the cigar lighter thereby bypassing the switch control means and current limiting element so that the cigar lighter can be operated in the normal manner.